F. A. WILLIAMS.

Support for Elevated Railway.

No. 8,860. Reissued Aug. 19, 1879.

INVENTOR=

Francis A. Williams

Per Burke & Fraser

Attys.

ATTEST=

Arthur C. Fraser.

George W. Thatcher

N. PETERS, PHOTO-LITHOGRAPHER, WASHINGTON, D. C.

UNITED STATES PATENT OFFICE.

FRANCIS A. WILLIAMS, OF KANSAS CITY, MISSOURI.

IMPROVEMENT IN SUPPORTS FOR ELEVATED RAILWAYS.

Specification forming part of Letters Patent No. 66,197, dated June 25, 1867; Reissue No. 8,860, dated August 19, 1879; application filed May 28, 1877.

*To all whom it may concern:*

Be it known that I, FRANCIS A. WILLIAMS, late of Cloverville, Delaware county, New York, but now of Kansas City, in the county of Jackson and State of Missouri, have invented certain Improvements in Elevated Railways, of which the following is a specification.

This invention relates to a new and useful improvement in elevated street-railways; its object being to so arrange and construct the posts or pillars by which the rails are supported that they do not occupy larger space on the sidewalk of the street, and are in no manner more inconvenient, than the common lamp-posts, so that a railway constructed on my improved plan would be no inconvenience to the pedestrians on the sidewalk or to the vehicles on the street.

My invention consists, chiefly, in the construction of the aforementioned supporting-pillars, which are so made that one single column or post can support the whole width of the railway. This post, being placed on the outer edge of the sidewalk, with its broader base built below the ground, would not occupy any considerable room on the sidewalk, which would be the case if two rows of such posts would have to be used.

In the accompanying drawings my invention is illustrated.

Figure 1:
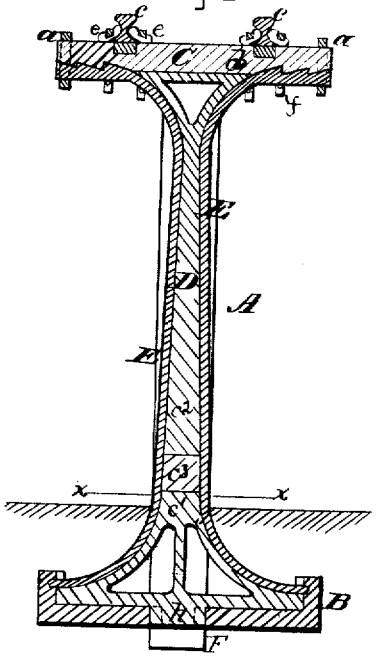
Figure 6:
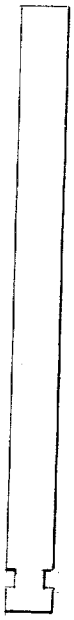
Figure 2:
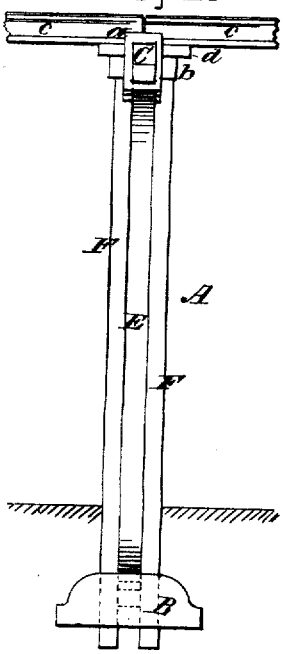
Figure 3:
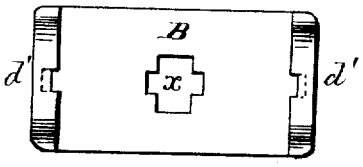
Figure 4:
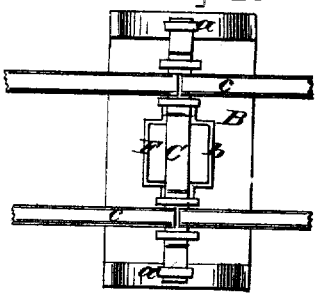
Figure 5:
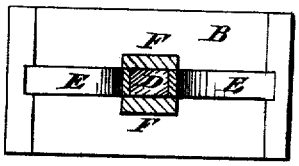

Figure 1 is a vertical cross-section of the supporting-pillar. Fig. 2 is a side elevation of the supporting-pillar. Fig. 3 is a plan or top view of the base-piece of the pillar. Fig. 4 is a plan view of Fig. 2. Fig. 5 is a plan view of the base-plate, showing also the post in section; and Fig. 6 represents one of the side braces.

Similar letters of reference indicate like parts in all the figures.

The main features of the railway are the supporting-columns A. The seare constructed of different braces or members in such a manner that each brace receives the weight independent of the others. If even one should break, the rest will still be able to support the rails and cars.

The pillars are placed at suitable distances apart. The most practicable distance from the center of one to the center of the other post would be the usual length of rails, so that the rails would be joined just above the pillar, a space of, say, three-eighths of an inch being left between the ends of the rails to allow for their expansion.

The ends of the rails *c* rest upon the sleeper C, into which is inserted a bed-piece, *d*, which extends beyond either side of the sleeper and supports the ends of the rails. The sleeper C is supported by the central portion, D, of the post, which may consist of three parts, $c^1$, $c^2$, and $c^3$, and by the edge bars, E E, and side bars, F F, the ends of the latter and central tenon, *h*, of the part $c^1$ fitting the central mortise, *x*, of the base-plate B, as is shown.

The lower portion, $c^1$, expands or becomes wider toward the bottom, and is held between two flanges, *d'*, in the base-plate, which are provided with suitable vertical grooves, so that the part $c^1$ may be inserted from above. The upper portion, $c^2$, may be secured to the sleeper C by means of bolts and nuts; but it may also be perfectly independent of the same. The central piece or key, $c^3$, is held between the upper piece, $c^2$, and the lower, $c^1$. The central part of the post thus made of three pieces, but which may as well be made of one piece, is not more than about one or two inches thick throughout its length. Its width varies, as seen at the bottom. Near the top it gradually increases in width, so as to support about one-third of the length of the sleeper C.

Each edge bar E E is of wrought square bar-iron bent in such a shape as to conform itself to the outlines of the central portion, D. The upper surface of each strip E, where it comes in contact with the sleeper C, is provided with notches and projections conforming to and fitting into corresponding projections and notches in the under side of the sleeper. At the bottom the bars E are held in grooves in the flanges *d'*. The rails are held down by keys or plates *e e*, which are held in place by bows or staples *f*.

The central and edge members, D and E, are protected and braced by side braces, F F, which are secured to the sleeper C by means of staples *b*. At their lower ends these bars and braces F F are notched and passed through a cross-shaped mortise, *x*, in the bed-plate B.

A column thus constructed is set together in the following order: The bed-plate B is first laid upon the ground sufficiently below the sidewalk to allow the wider lower portion of the column to be below ground. The bars F are then dropped through the wider portion of the mortise in the bed-plate, and are then passed into the narrow recesses which form a part of the mortise, into which they fit snugly. The lower portion, $c^1$, of the central support is then dropped between the braces, its tenon $h$ fitting into and closing the mortise, thus locking the braces F, while itself is well held in the ground by the flanges $d'$. The sleeper, with upper central piece, $c^2$, is now hung upon the braces F, the key $c^3$ is now dropped into its place, and the side bars, E, are secured. The column is then ready to receive the rails.

I claim—

1. The combination of a pillar consisting of supporting members E F D, or their equivalents, and a base-plate, B, adapted to receive the lower ends of the members composing the pillar and to afford an extended base for the same, substantially as set forth.

2. The combination of a pillar consisting of the supporting members, substantially as described, and a supporting bed-plate consisting of a rectangular plate of metal secured to the extreme lower end of the said supporting members and constituting the base of the pillar, as set forth.

3. The combination of the post D, tenon $h$, and base-plate B, having a mortise to receive the tenon, substantially as set forth.

Subscribed to by me before two witnesses.

FRANCIS A. WILLIAMS.

Attest:

HENRY CONNETT,
ARTHUR C. FRASER.

Correction for Reissued Letters Patent No. 8,860.

It is hereby certified that at the time Reissued Letters Patent No 8,860 were granted to Francis A. Williams, of Kansas City, Missouri, for an improvement in Supports for Elevated Railways, August 19, 1879, there was on record in this Office (Liber Q21, page 324,) an assignment from said Williams of one-half of his right, title and interest to William H. Knauss, of Newark, N. J., and that the patent should have issued to said assignee jointly with the inventor; that the correction has been made in the file and papers relating to the case, and is hereby made in said Letters Patent to make the title therein conform to the records of this Office.

Signed, countersigned, and sealed this 18th day of January, A. D. 1881.

[SEAL.]

A. BELL,
*Acting Secretary of the Interior.*

Countersigned:

E. M. MARBLE,
*Commissioner of Patents.*